March 7, 1961    H. G. COOK    2,973,833
PISTON WITH FILTER
Filed Aug. 25, 1958    2 Sheets-Sheet 1

INVENTOR.
HAROLD G. COOK
BY
*J. M. St. Amand*
ATTORNEYS.

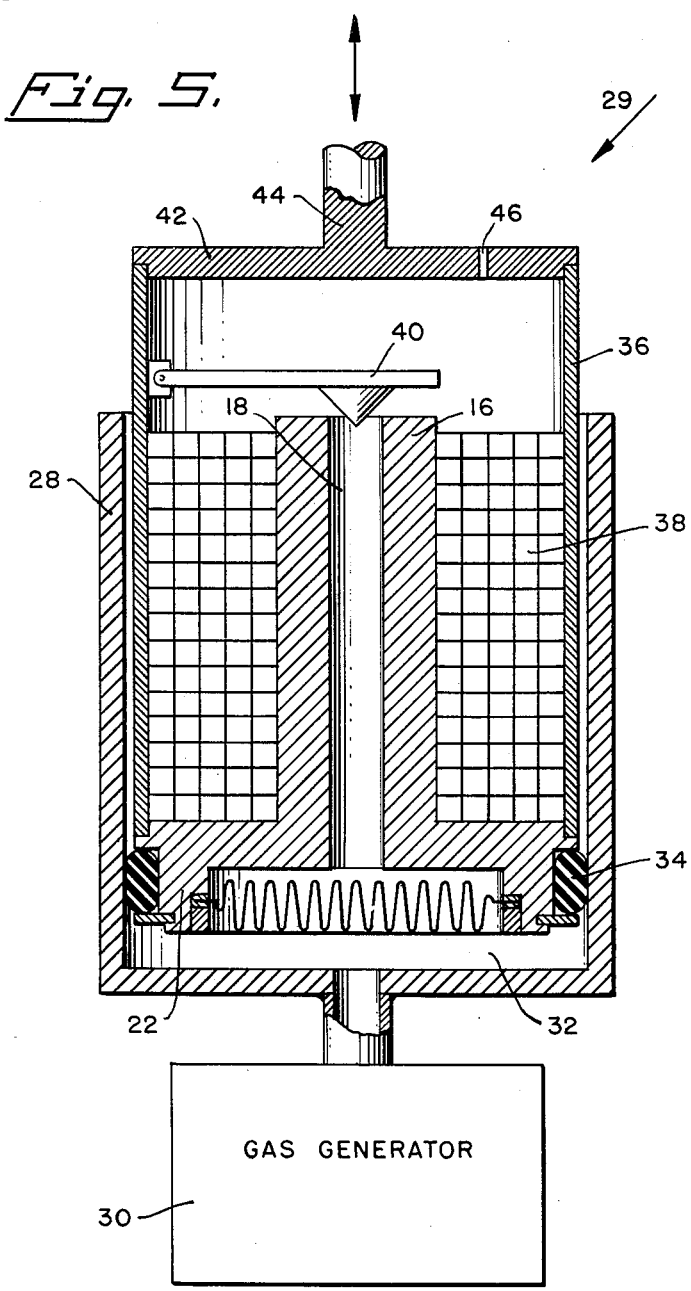

United States Patent Office 2,973,833
Patented Mar. 7, 1961

2,973,833
PISTON WITH FILTER

Harold G. Cook, China Lake, Calif., assignor to the United States of America as represented by the Secretary of the Navy Filed Aug. 25, 1958, Ser. No. 757,159

4 Claims. (Cl. 183—71)

(Granted under Title 35, U.S. Code (1952), sec. 266)

The invention described herein may be manufactured and used by or for the Government of the United States of America for governmental purposes without the payment of any royalties thereon or therefor.

The present invention relates to filters and more particularly to a filter used in a gas-operated servo system actuated by combustion gases from a gas generator to protect piston valves and the like in the servo system from carbon, lead, and other products of combustion in the gas produced by the gas generator.

Previously, products of combustion would be deposited on valve parts causing serious malfunction of the servo system. The present invention collects the undesirable products of combustion from the gas stream before they can be deposited on the valve parts. The filter of this invention may be formed of a disk of corrugated sintered poromesh material, the edge of the disk being swaged flat to form a ridge around its circumference. If desired, a crimp ring may be used to reinforce the flat ridge about the circumference of the disk, also a plurality of stacked disks may be used to increase the filtering effect.

An object of the invention is to provide a new and improved filter for filtering out undesirable combustion products from gas produced by a gas generator.

Another object is to provide a new filter of corrugated poromesh material.

A further object is to provide a new filter of sintered fine woven wires.

Other objects and many of the attendant advantages of this invention will be readily appreciated as the same become better understood by reference to the following detailed description when considered in connection with the accompanying drawings wherein:

Fig. 5 is a view, partly in section, of the gas generator and actuator assembly.

Referring now to the drawings, like numerals refer to like parts in each of the figures.

Figure 1:
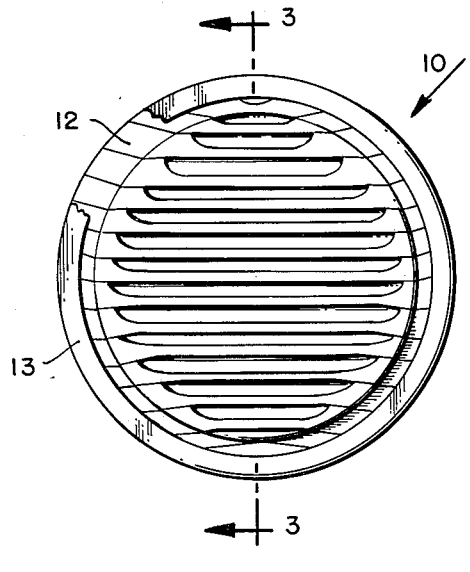
Fig. 1 is a plan view of the filter of the present invention.
Figure 2:
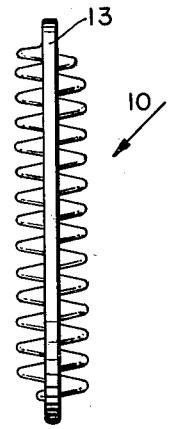
Fig. 2 is a side view of the filter of Fig. 1.
Figure 3:
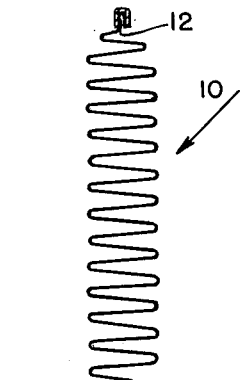
Fig. 3 is a cross-sectional view taken along the line 3—3 of Fig. 1.

The filter assembly 10 of Figs. 1-3 is made up of closely woven fine wires forming a poromesh material. The wires may be made of stainless steel, for example, and woven into a mesh having approximately 1400 x 165 wires per square inch (this example of material would result in mesh having approximately 265,000 holes per square inch.) The resulting woven poromesh material may be secured by sintering, if desired, to provide better strength and filtering characteristics. Woven stainless steel mesh is sintered by heating in a protective atmosphere by pure dry hydrogen at a temperature of approximately 90% of the absolute melting point of the alloy concerned (about 2400° F.), for a period of several hours. Following proper sintering the woven wire mesh material is not only completely bright annealed, but also bonded into an integrated porous sheet with the wires joined or fused at every point of contact. Sintering also reduces the porous sheet to a uniform base hardness level, bonds the entire woven structure into one ductile integrated sheet and makes it impossible for the material to fray and for the individual strands to migrate. This poromesh is corrugated, as shown in the drawings, and cut into circular or other desirable shapes. The outer periphery of filter 10 is then uniformly folded and swaged thereabout to form a ridge 12. A crimp ring 13 may be used over ridge 12 for better sealing, reinforcement and easier handling. The corrugations in the filter provide greater surface area for filtering out undesirable by-products of combustion from the gas passing therethrough.

The filter of the present invention has many uses, but in the present example it is used in a servo system for filtering solid products from gas at temperatures of 1000° F. and above. This filter operates at extremely high temperatures where all other types of filters fail.

Figure 4:
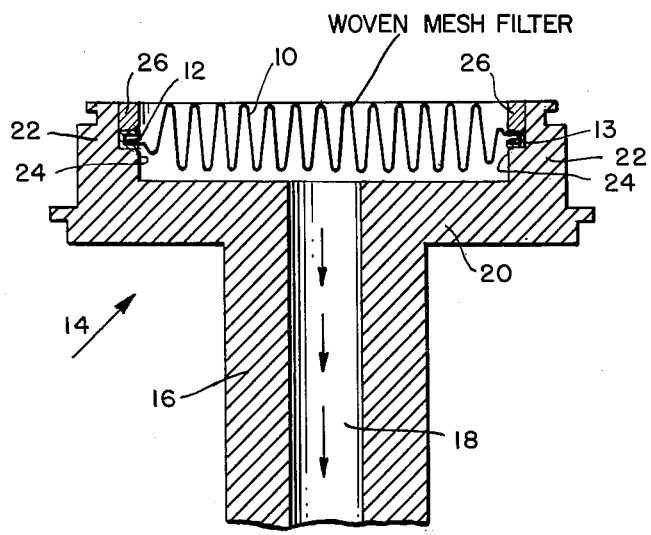
Fig. 4 is a fragmentary cross-sectional view of a servo-system part with filter.

Fig. 4 shows, in cross-section, filter 10 positioned in the end of a part 14 which has a shaft 16 having an internal passage 18 through which hot gases pass after being filtered through filter 10. The part 14 is formed with a head 20 which has a raised internally-stepped peripheral flange 22 thereon thereby providing a shoulder or step 24. The swaged circumferential ridge 12 of filter 10 rests on step 24 within peripheral flange 22. A filter retainer 26 is press fitted within flange 22 against ridge 12 which sealingly retains filter 10 on part 14.

For a better understanding of the function of part 14 shown in Fig. 4, reference may be had to Fig. 5 wherein part 14 is shown mounted for movement within a cylinder 28 of actuating assembly 29. A gas generator 30 supplies high pressure gas to a chamber 32 located between the head of part 14 and the bottom of cylinder 28, a seal 34 on flange 22 serving to prevent the escape of gas between the head and the sides of cylinder 28. A cylindrical member 36 is attached to flange 22 of part 14 and disposed within the member and around shaft 16 is an electromagnetic coil 38. Pivotally mounted on member 36 is a valve part 40 which is operative, under the magnetic force of coil 38, to control the flow of gas through passage 18. Fixed to member 36 is a cover 42 formed with an actuating rod 44 for applying a force to an element to be actuated and a bleed opening 46 permitting escape of the gas issuing from passage 18. The closing force applied to valve part 40 by the coil 38 determines the pressure in chamber 32 and the corresponding force applied by rod 44.

The filter operates as follows: Hot gas from the gas generator flows into chamber 32 from which the gas must then flow through the filter, where the carbon, lead, dirt and other solid by-products of combustion are collected. After filtering, the clean gas passes into the passage 18 in the shaft 16 and on past valve part 40. The present filter has the advantages of permitting longer operation of valve parts and the like, without malfunction due to the buildup of dirt from solid by-products of combustion from hot gases. This type of filter may be used in numerous filter systems especially those for filtering gases and which must operate at temperatures of 1000° F. and above.

Obviously, many modifications and variations of the present invention are possible in the light of the above teachings. It is therefore to be understood that within the scope of the appended claims the invention may be practiced otherwise than as specifically described.

What is claimed is:

1. In a gas operated servo system including an actuator assembly having a part with a hollow bore therein, a filter for filtering out carbon, lead and other solid combustion products from hot gases, said filter being located in said bore, said filter comprising a circular disk of uniformly corrugated poromesh material, said poromesh material being comprised of finely woven stainless steel wires for operating at extremely high temperatures and having approximately 265,000 holes per square inch, the peripheral edge of said filter disk being swaged flat to form a ridge around its circumference, and retaining means for keeping said filter in place in said bore.

2. A device as in claim 1 wherein said poromesh material of finely woven wires is sintered.

3. A filter for filtering out carbon, lead and other solid combustion products from hot gases, comprising a disk of uniformly corrugated poromesh material, said poromesh material comprising a closely woven mesh of fine stainless steel wires to extremely high temperatures and capable of operating from 1000° F. to extremely high temperatures, the peripheral edge of said disk being swaged flat to form a ridge around its circumference and to strengthen said disk.

4. A filter as in claim 3 wherein said poromesh material comprises a woven mesh of fine metal wires having 1400 x 165 wires per square inch.

References Cited in the file of this patent

UNITED STATES PATENTS

| | | |
|---|---|---|
| 1,012,968 | Bartz | Dec. 26, 1911 |
| 1,071,822 | Storey | Sept. 2, 1913 |
| 1,304,918 | Sweetland | May 27, 1919 |
| 1,781,254 | Stelzner | Nov. 11, 1930 |
| 2,082,513 | Roberts | June 1, 1937 |
| 2,212,043 | Pyzel | Aug. 20, 1940 |
| 2,423,547 | Behlen | July 8, 1947 |
| 2,607,435 | Dohse | Aug. 19, 1952 |

FOREIGN PATENTS

| | | |
|---|---|---|
| 46,547 | France | of 1936 |
| 812,636 | France | of 1937 |
| 502,765 | Great Britain | of 1939 |

OTHER REFERENCES

Lemcke et al.: German application Serial No. A17810, printed November 15, 1956 (Kl. 61a 29).

UNITED STATES PATENT OFFICE
CERTIFICATE OF CORRECTION

Patent No. 2,973,833                        March 7, 1961

Harold G. Cook

It is hereby certified that error appears in the above numbered patent requiring correction and that the said Letters Patent should read as corrected below.

Column 3, line 18, strike out "to extremely high temperatures" and insert instead -- having at least 200,000 holes per square inch --.

Signed and sealed this 12th day of September 1961.

(SEAL)
Attest:

ERNEST W. SWIDER                          DAVID L. LADD
Attesting Officer                            Commissioner of Patents

USCOMM-DC